(12) United States Patent
Park et al.

(10) Patent No.: US 12,090,479 B2
(45) Date of Patent: Sep. 17, 2024

(54) METHOD FOR DETECTING ALDEHYDES OR KETONES

(71) Applicant: LG CHEM, LTD., Seoul (KR)

(72) Inventors: Byung Hyun Park, Daejeon (KR); Byoung Hyoun Kim, Daejeon (KR); Su Youn Han, Daejeon (KR)

(73) Assignee: LG CHEM, LTD., Seoul (KR)

( * ) Notice: Subject to any disclaimer, the term of this patent is extended or adjusted under 35 U.S.C. 154(b) by 712 days.

(21) Appl. No.: 17/263,771

(22) PCT Filed: Apr. 8, 2020

(86) PCT No.: PCT/KR2020/004722
§ 371 (c)(1),
(2) Date: Jan. 27, 2021

(87) PCT Pub. No.: WO2020/213875
PCT Pub. Date: Oct. 22, 2020

(65) Prior Publication Data
US 2021/0308670 A1    Oct. 7, 2021

(30) Foreign Application Priority Data

Apr. 18, 2019 (KR) .................. 10-2019-0045502

(51) Int. Cl.
*B01L 3/00* (2006.01)
*G01N 30/94* (2006.01)

(52) U.S. Cl.
CPC .......... *B01L 3/50273* (2013.01); *G01N 30/94* (2013.01); *B01L 2200/0652* (2013.01);
(Continued)

(58) Field of Classification Search
CPC ..... B01L 2400/0409; B01L 2400/0406; B01L 2300/0861; B01L 2300/0806;
(Continued)

(56) References Cited

U.S. PATENT DOCUMENTS

2003/0144642 A1* 7/2003 Dopps ............... A61F 13/53747
604/378
2012/0028852 A1* 2/2012 Lee ................. B01L 3/502753
506/39
(Continued)

FOREIGN PATENT DOCUMENTS

CN  109894166 A  *  6/2019
CN  109954522 A      7/2019
(Continued)

OTHER PUBLICATIONS

Safavieh et al., Serpentine and leading-edge capillary pumps for microfluidic capillary systems, 2015, Microfluid Nanofluid (2015) 18:357-366 (Year: 2015).*

(Continued)

*Primary Examiner* — Paul S Hyun
*Assistant Examiner* — Mickey Huang
(74) *Attorney, Agent, or Firm* — Bryan Cave Leighton Paisner LLP (57) ABSTRACT

A method for simulataneously separating and detecting aldehydes or ketones from a plurality of samples containing the samein a simple and rapid manner by using a rotary microdevice capable of integrating derivatization and TLC separation of aldehydes and ketones, and the method providing reliable TLC separation, control of moving speed of an eluent on a TLC plate, and improved TLC resolution.

18 Claims, 8 Drawing Sheets

(52) U.S. Cl.
CPC . *B01L 2300/069* (2013.01); *B01L 2300/0806* (2013.01); *B01L 2300/0861* (2013.01); *B01L 2400/0406* (2013.01); *B01L 2400/0409* (2013.01)

(58) Field of Classification Search
CPC ....... B01L 2300/069; B01L 2200/0652; B01L 3/50273; G01N 30/94
See application file for complete search history.

(56) References Cited

U.S. PATENT DOCUMENTS

| | | | | |
|---|---|---|---|---|
| 2012/0328488 | A1* | 12/2012 | Puntambekar | B01L 3/5025 422/503 |
| 2014/0186935 | A1* | 7/2014 | Yoo | G01N 35/00069 435/287.7 |

FOREIGN PATENT DOCUMENTS

| | | |
|---|---|---|
| EP | 2610618 A1 | 7/2013 |
| EP | 2071331 B1 | 10/2013 |
| EP | 3000530 B1 | 5/2018 |
| JP | 2007-136294 A | 6/2007 |
| JP | 2014-508952 A | 4/2014 |
| KR | 10-0446468 B1 | 9/2004 |
| KR | 10-2011-0079570 A | 7/2011 |
| KR | 10-2011-0088746 A | 8/2011 |
| KR | 10-2014-0148194 A | 12/2014 |
| KR | 10-2017-0017687 A | 2/2017 |
| KR | 10-1977963 B1 | 8/2019 |

OTHER PUBLICATIONS

Sarah Miller, Tips and Tricks for the Lab: Column Troubleshooting and Alternatives, 2012, Wiley-VCH GmbH (Year: 2012).*
Ye et al., CN 109894166 translation, Jun. 2019, USPTO (Year: 2019).*
Ashghar et al., Engineering long shelf life multi-layer biologically active surfaces on microfluidic devices for point of care application, 2016, Scientific Reports, 6:21163 (Year: 2016).*
Agrawal et al., Centrifugally accelerated thin layer chromatography for isolation of marker compounds and bioactive, 2015, Journal of Pharmacognosy and Phytochemistry, JPP 2015; 3(6): 145-149 (Year: 2015).*
Tyihak et al., Behavior of the Dinitrophenylhydrazones of Saturated Aldehydes and Ketones in Normal and Reversed Phase TLC and OPLC, 1992, Journal of Planar Chromatography (Year: 1992).*
Schembri et al., Centrifugation and capillarity integrated into a multiple analyte whole blood analyser, 1995, Journal of Automatic Chemistry, vol. 17, No. 3 (May-Jun. 1995), pp. 99-104 (Year: 1995).*
Burckle et al., Determination of Formaldehyde in Ambient Air Using Adsorbent Cartridge Followed by High Performance Liquid Chromatography (HPLC), 1999, EPA, Second Edition (Year: 1999).*
"Guide to Lateral Flow Immunoassays", Innova Biosciences, 2017 (Year: 2017).*
Seo et al., KR20170017687A description translation, Feb. 15, 2017, EPO (Year: 2017).*

* cited by examiner

ial Application No. PCT/KR2020/004722, filed on
METHOD FOR DETECTING ALDEHYDES OR KETONES

CROSS-REFERENCE TO RELATED APPLICATION(S)

This application is a National Stage Application of International Application No. PCT/KR2020/004722, filed on Apr. 8, 2020, which claims the benefit of priority based on Korean Patent Application No. 10-2019-0045502 filed on Apr. 18, 2019, and all contents disclosed in the patent document are included as a part of this specification.

TECHNICAL FIELD

The present invention relates to a method for detecting aldehydes or ketones, and more specifically, to a method for quickly separating and detecting aldehyde or ketone compounds in a simple TLC separation manner using a rotating force.

BACKGROUND

A carbonyl compound such as an aldehyde and a ketone is widely used in various fields because of its sterilization and strong reduction action, but is known as a harmful substance which is highly toxic and carcinogenic in humans and animals. Therefore, regulation on the carbonyl compound has been strengthened, and thus, it is required to establish a method for detecting and analyzing the harmful carbonyl compound.

Meanwhile, since the carbonyl compound does not have a chromophore, it cannot be detected with a UV detector. Accordingly, a method mainly used comprises reacting the carbonyl compound of a low molecular weight such as the aldehyde and the ketone which is present in air and water with 2,4-dinitrophenylhydrazine (DNPH) to produce a hydrazone derivative, and then detecting the derivative compound with a high-performance liquid chromatography (HPLC) (see JP 2010-008311A).

This HPLC method is a representative method for measuring the carbonyl compound, and has the advantage of high sensitivity and selective detection. However, there is a problem in that an expensive commercial DNPH cartridge must be used for derivatization and the operation is complicated.

SUMMARY

Technical Challenges

The present invention is to solve the above problem, and a purpose of the present invention is to provide a method for separating and detecting aldehydes or ketones in a more economical and simple manner capable of replacing a HPLC that uses an expensive commercial DNPH cartridge and is complicatedly operated.

Technical Solutions

According to an aspect of the present invention, a method for detecting aldehydes or ketones comprises the steps of:
(S1) providing a rotary micro device comprising one or more structures disposed on a rotary platform, wherein each of the structures includes a sample storage unit filled with a derivatizing compound for aldehydes or ketones, an eluent storage unit, a thin layer chromatography (TLC) plate equipped with an absorption pad, a first micro-channel connecting the sample storage unit and the TLC plate and having a bent portion, and a second micro-channel connecting the eluent storage unit and the TLC plate and having the bent portion, the number of the bent portions of the second micro-channels being more than the number of the bent portions of the first micro-channels, and
supplying a fluid sample containing aldehydes or ketones and an eluent for deploying the sample to the sample storage unit and the eluent storage unit, respectively;
(S2) performing derivatization of the aldehydes or the ketones by carrying out the first rotation of the rotary micro device to react the fluid sample with the derivatizing compound filled in the sample storage unit;
(S3) introducing the fluid sample containing the derivatized aldehydes or ketones into the TLC plate by carrying out the second rotation of the rotary micro device;
(S4) performing TLC separation of the sample by carrying out the third rotation of the rotary micro device to introduce the eluent into the absorption pad of the TLC plate and moving the eluent absorbed into the absorption pad;
(S5) drying the TLC plate by carrying out the fourth rotation of the rotary micro device; and
(S6) repeatedly performing the TLC separation of the sample by carrying out the fifth rotation of the rotary micro device to introduce the eluent back into the absorption pad of the TLC plate and moving the eluent reabsorbed into the absorption pad.

The TLC plate includes an eluent introduction portion, a sample introduction portion, and a deployment portion, wherein the eluent introduction portion is provided with the absorption pad, and the eluent introduction portion of the TLC plate may be connected to the eluent storage unit by the second micro-channel, and the sample introduction portion of the TLC plate may be connected to the sample storage unit by the first micro-channel.

In the rotary micro device, the first micro-channel and the second micro-channel may be connected by an air circulation channel, and the first micro-channel may include a waste channel for preventing excessive introduction of the sample between the bent portion and the sample introduction portion of the TLC plate.

On the other hand, after the first rotation of the step (S2), while the rotary micro device is stopped, the fluid sample containing the derivatized aldehydes or ketones may move into the first micro-channel from the sample storage unit by a capillary force and stay therein, and the eluent may move into the second micro-channel from the eluent storage unit by a capillary force and stay therein.

Further, during the second rotation of the step (S3), while the fluid sample containing the derivatized aldehydes or ketones moves from the first micro-channel by the rotating force and flows into the TLC plate, the fluid sample may continuously stay in the second micro-channel having the multiple bent portions.

The first rotation of the step (S2) may be performed at a speed of 2,500 to 5,000 rpm for 5 to 20 seconds, and the second rotation of the step (S3) may be performed at a speed of 2,000 to 4,000 rpm for 0.5 to 2 seconds.

The third rotation of the step (S4) and the fifth rotation of the step (S6) may be performed at the slowest speed and for the longest time relatively compared to the other steps to perform the inflow of the eluent and the TLC separation. The third rotation of the step (S4) and the fifth rotation of the step (S6) may be performed at a speed of 500 to 1,000 rpm for 1 to 5 minutes. A flow rate of the eluent may be 0.5 to 1.5 µl/s.

Further, the fourth rotation for drying the TLC plate in the step (S5) may be performed at a speed of 2,000 to 5,000 rpm for 3 to 5 minutes.

On the other hand, the deployment portion of the TLC plate may be disposed to face the opposite direction from the center of rotation in the rotary micro device, and the absorption pad provided in the eluent introduction portion of the TLC plate may occupy 5 to 10% of the total length of the TLC plate. In addition, the absorption pad may be made of a fiber having an OH functional group, such as a cellulose fiber, a gelatin fiber, a starch fiber, or a mixture of two or more thereof.

The derivatizing compound may be 2,4-dinitrophenylhydrazine (2,4-DNPH), and the 2,4-DNPH may be coated on the surface of a silica in the form of a porous bead and filled into the sample storage unit.

The aldehyde or ketone sample may include formaldehyde, acetaldehyde, acrolein, acetone, propionaldehyde, butyraldehyde, benzaldehyde, crotonaldehyde, iso-valeraldehyde, n-valeraldehyde, o-tolualdehyde, m-tolualdehyde, p-tolualdehyde, hexaldehyde, 2,5-dimethylbenzaldehyde, hexanal, or a mixture of two or more thereof.

Furthermore, the eluent may be a mixed solvent of acetonitrile and water, or a mixed solvent of ethyl acetate and hexane.

Effect of the Invention

According to the present invention, the derivatization of the aldehydes or the ketones and the TLC separation thereof are integrally performed in a rotary micro device to simultaneously separate and detect a plurality of samples containing the aldehydes or the ketones simply and quickly, thereby allowing qualitative and quantitative analysis of aldehydes or ketones economically and efficiently as compared to the known HPLC that uses an expensive commercial DNPH cartridge and is complicatedly operated.

In particular, according to the method of the present invention, the sample and the eluent are sequentially introduced into the TLC plate by a rotating force, and then the sample can be stably separated on the TLC by moving the eluent through the absorption pad to diffuse the eluent uniformly. Also, the speed at which the solvent is moved to the TLC can be controlled by controlling the strength of the rotating force. In addition, after the sample is separated once, the solvent remaining on the TLC is dried by rotation, and a resolution of the TLC can be improved by applying the rotating force again to repeat inflow of the eluent and TLC separation.

BRIEF DESCRIPTION OF THE DRAWINGS

The drawings attached to this specification are intended to illustrate preferred embodiments of the present invention, and serve to further understand the technical idea of the present invention together with the contents of the above-described invention. Accordingly, The present invention should not be construed to be limited only to the contents described in the drawings.

DETAILED DESCRIPTION

Hereinafter, preferred embodiments of the present invention will be described in detail with reference to the accompanying drawings. The terms or words used in the specification and claims should not be construed to be limited to the ordinary or dictionary meanings, and should be interpreted as meanings and concepts consistent with the technical idea of the present invention, based on the principle that the inventor can properly define concepts of the terms in order to best explain his/her own invention.

Throughout the specification, in case it is described that a certain portion is "connected" to other portion, this means not only that the portion is "directly connected" to the other portion, but also that another member is interposed therebetween and is "electrically connected" to each other.

Throughout the specification, in case it is described that a certain portion "comprises" or "includes" a certain constitutive element, this means that the portion may further comprise or include other constitutive element without excluding it, unless otherwise stated. In addition, the terms such as " . . . unit", " . . . group", and "module" described in the specification refer to a unit that processes at least one function or operation.

An embodiment of the present invention relates to a method for detecting an aldehyde or ketone sample using a rotary micro device.

Figure 1:
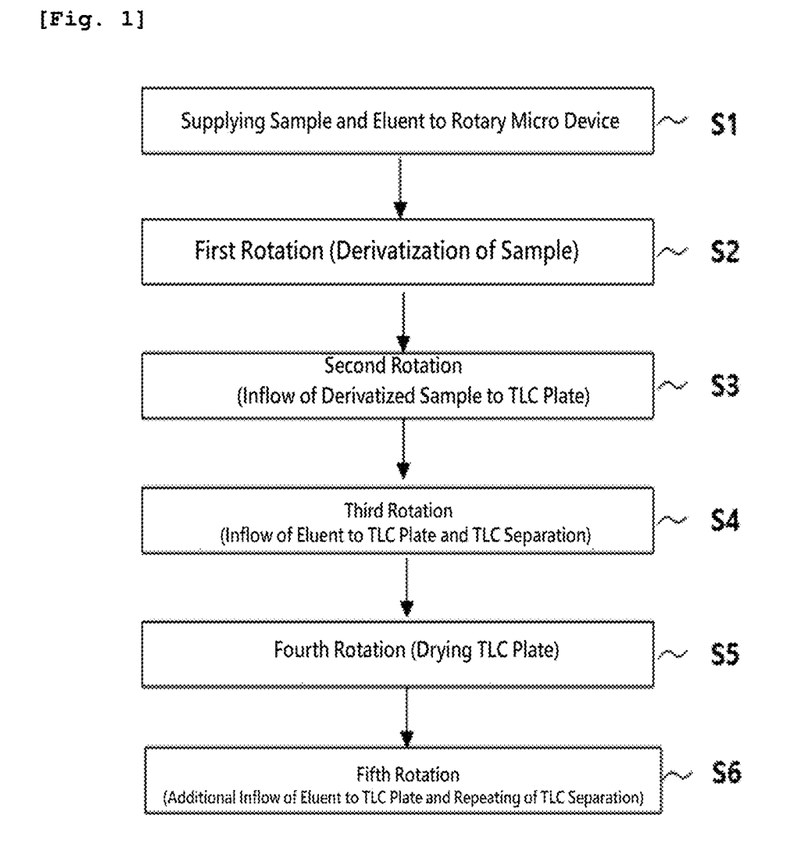
FIG. 1 is a flowchart illustrating a process of separating and detecting aldehydes or ketones using a rotary micro device according to an embodiment of the present invention.
Figure 2:
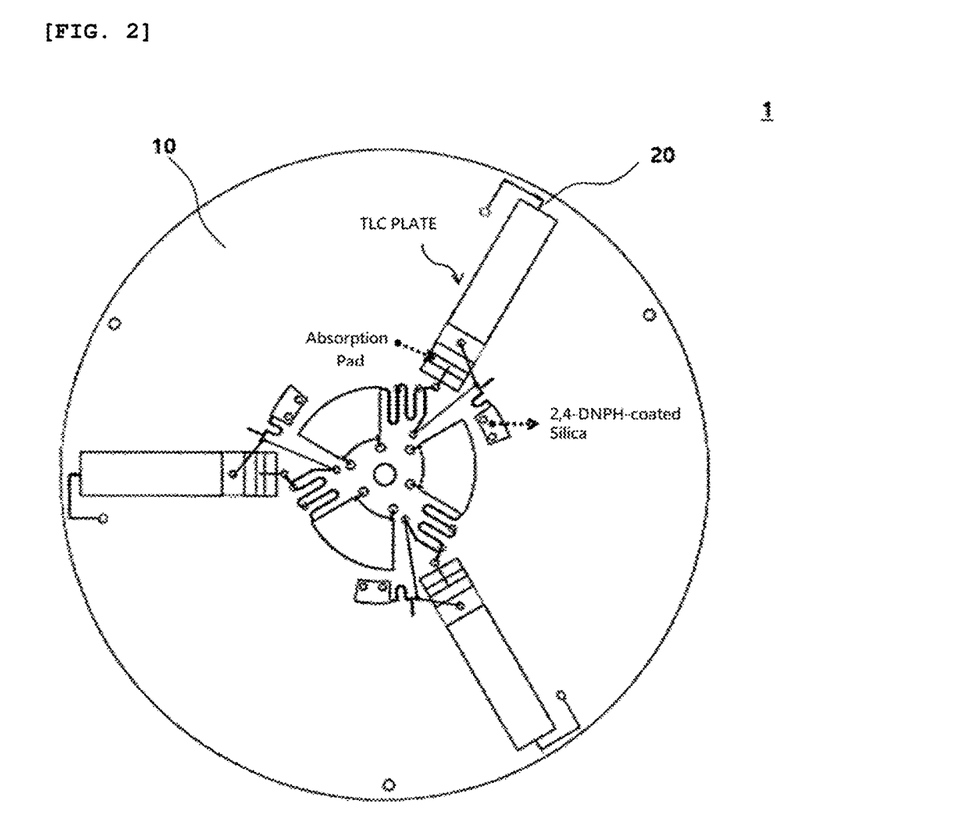
FIG. 2 schematically illustrates a rotary micro device that can be used in a method for detecting aldehydes or ketones according to an embodiment of the present invention.
Figure 3:
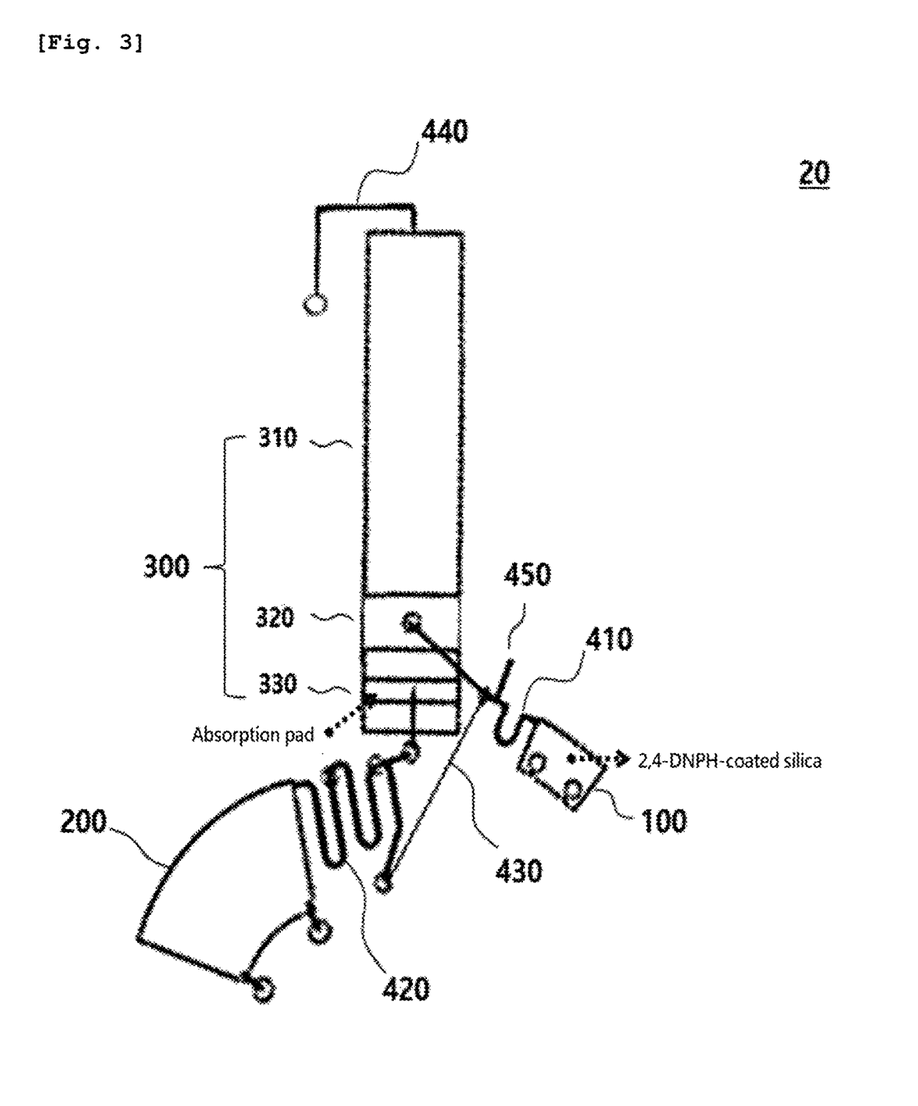
FIG. 3 shows a structure included in the rotary micro device of FIG. 2.
Figure 4A:
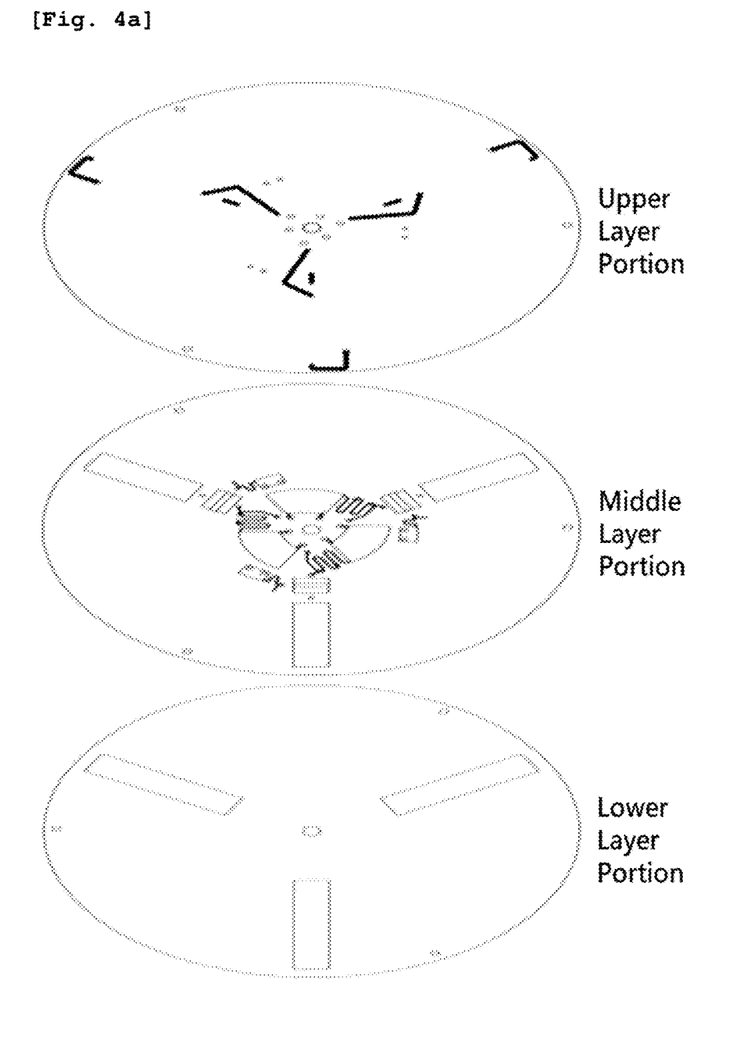
FIGS. 4a to 4d show each layer of a rotary platform including a structure in a rotary micro device.
Figure 4B:
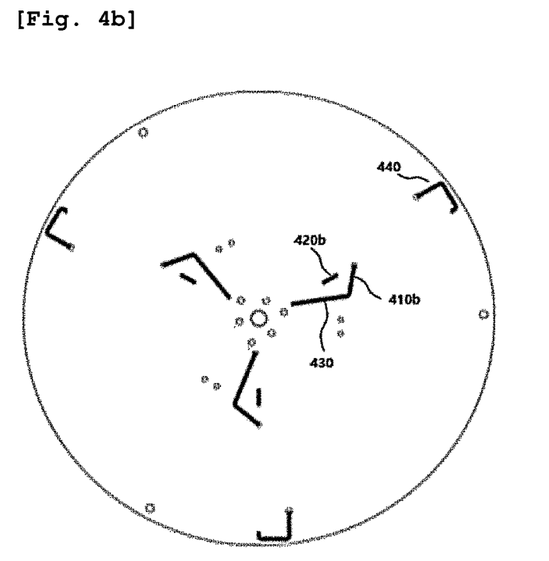
Figure 4C:
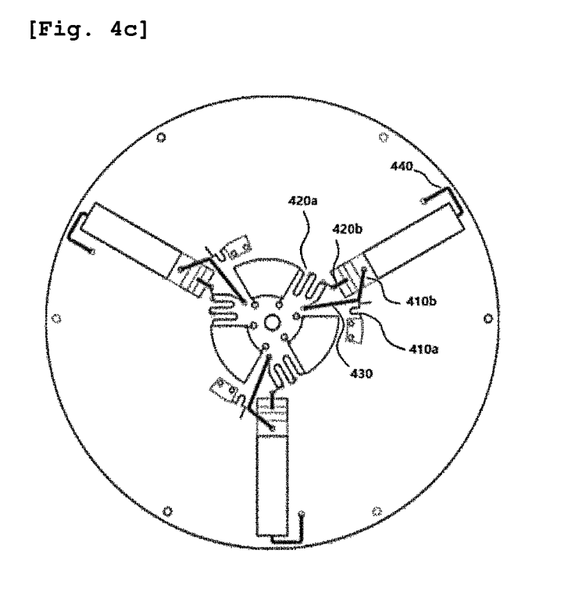
Figure 4D:
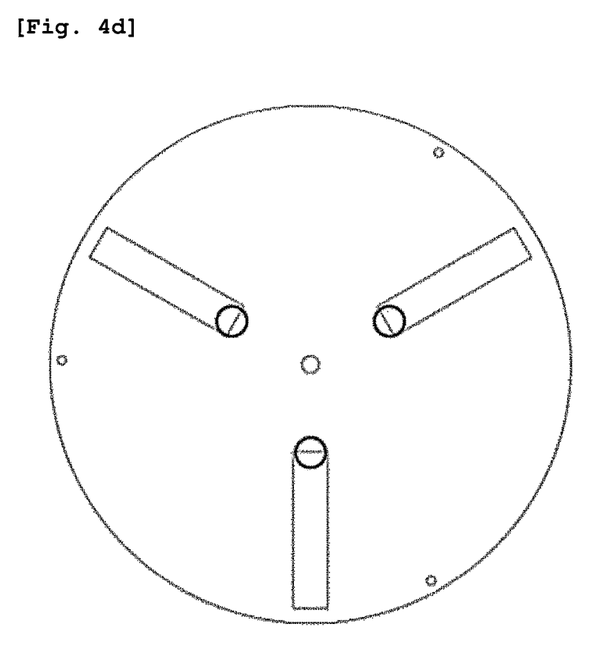

FIG. 1 is a flowchart illustrating a process of detecting aldehydes or ketones using a rotary micro device according to an embodiment of the present invention, and FIGS. 2 to 4 illustrate a rotary micro device that can be used in a method for detecting aldehydes or ketones according to the present invention.

Hereinafter, the method for detecting the aldehydes or the ketones according to the present invention will be described step by step with reference to the drawings.

First, the rotary micro device is provided and the aldehyde or ketone sample and an eluent for deploying the sample are supplied to the device (S1).

Referring to FIG. 2, the rotary micro device 1 comprises a rotary platform 10 and one or more structures 20 disposed on the rotary platform.

The rotary platform 10 may be, for example, a circular disk, and a size thereof may be, for example, 14 cm to 17 cm in diameter.

The one or more structures 20 having the same size may be radially disposed on the rotary platform 10, and the number of structures 20 may be three, four, five, or six or more according to various environments in which the present invention is implemented. In addition, the size and shape of each structure itself may be appropriately modified according to various environments in which the present invention is implemented.

As Such, the rotary micro device 1 comprises the plurality of structures 20 having the same size, and the multiple samples can be analyzed simultaneously by driving the plurality of structures with a rotating force.

Referring to FIG. 3, the structure 20 includes a sample storage unit 100 filled with a derivatizing compound for the aldehydes or the ketones, respectively; a eluent storage unit 200; a TLC (thin layer chromatography) plate 300 equipped with an absorption pad; a first micro-channel 410 connecting the sample storage unit and the TLC plate; and a second micro-channel 420 connecting the eluent storage unit and the TLC plate. Each of the first micro-channel and the second micro-channel may include a bent portion (e.g., a siphon channel having a n shape). Further, the structure 20 may include air circulation channels 430 and 440 connecting the first micro-channel and the second micro-channel. Furthermore, the first micro-channel may include a waste channel 450 for preventing excessive inflow of the sample between the bent portion and a sample introduction portion of the TLC plate.

As illustrated in FIG. 3, the TLC plate includes an eluent introduction portion 330, a sample introduction portion 320, and a deployment portion 310 on one side thereof, and the absorption portion is provided in the eluent introduction portion 330. The eluent introduction portion 330 of the TLC plate is connected to the eluent storage unit 200 by the second micro-channel 420, and the sample introduction portion 320 of the TLC plate is connected to the sample storage unit 100 by the first micro-channel 410.

Meanwhile, referring to FIG. 4, the rotary platform 10 included in the rotary micro device 1 is fabricated by assembling an upper layer portion, a middle layer portion and a lower layer portion (FIG. 4a), and the constitutive elements of the structure 20 can be formed in the upper layer portion (FIG. 4b), the middle layer portion (FIG. 4c) and the lower layer portion (FIG. 4d) through a patterning process using a micro milling. On the other hand, among the constitutive elements of the structure 20, the TLC plate provided with the absorption pad is mounted at a position of the lower layer portion (FIG. 4d).

Specifically, a first part 410a of the first micro-channel 410 and a first part 420a of the second micro-channel 420 are arranged on the middle layer portion, the first part 410a includes the bent portion connected to the sample storage unit 100, and the first part 420a includes the bent portion connected to the eluent storage unit 200. A second part 410b of the first micro-channel 410 and a second part 420b of the second micro-channel 420 are arranged on the upper layer portion, the second part 410b of the first micro-channel 410 includes a portion connected to the TLC plate 300, and the second part 420b of the second micro-channel 420 also includes a portion connected to the TLC plate 300. This arrangement is made such a manner that, after the sample is accommodated into the first part 410a of the first micro-channel 410 from the sample storage unit 100 disposed in the middle layer portion, the sample falls from the top of the TLC plate 300 in a downward direction, that is, onto the TLC plate 300, when the sample is introduced from the first micro-channel 410 into the TLC plate 300. Accordingly, the sample may be more uniformly deployed on the TLC plate 300.

In the rotary micro device 1 as described above, the aldehyde or ketone sample is supplied to the sample storage unit 100, and the eluent for deploying the sample is supplied to the eluent storage unit 200.

In an embodiment of the present invention, the aldehyde or ketone fluid sample may include formaldehyde, acetaldehyde, acrolein, acetone, propionaldehyde, butyraldehyde, benzaldehyde, crotonaldehyde, iso-valeraldehyde, n-valeraldehyde, o-tolualdehyde, m-tolualdehyde, p-tolualdehyde, hexaldehyde, 2,5-dimethylbenzaldehyde, hexanal, or a mixture of two or more thereof.

The derivatizing compound is a substance used to chemically derivatize the aldehydes or the ketones which are by themselves difficult to detect a UV due to the absence of a chromophore.

In an embodiment of the present invention, the derivatizing compound may be 2,4-dinitrophenylhydrazine (2,4-DNPH), which can be used by being coated on the surface of a silica having the form of porous beads. For example, 2,4-DNPH-coated silica may be filled into the sample storage unit 100 in the form of beads. Since the porous material described above has a large surface area, it is possible to maximize coating of the 2,4-DNPH compound, which is advantageous for derivatizing the aldehydes/ketones.

Next, the rotary micro device 1 is first rotated to react the aldehyde or ketone sample and the derivatizing compound in the sample storage unit 100, thereby performing derivatization of the aldehydes or the ketones (S2).

For example, in case the aldehyde or ketone sample is 3-propionaldehyde and the derivatizing compound is 2,4-DNPH, the following reaction is carried out in the sample storage unit 100 to produce a propionyl-2,4-dinitrophenylhydrazone derivative.

The conventional method for detecting the aldehydes or the ketones should use an expensive commercial DNPH cartridge for the above derivatization reaction. In contrast, the derivatization according to the present invention can be performed without using the expensive commercial DNPH cartridge by supplying the aldehyde or ketone sample in a state in which a derivatizing compound for the aldehydes or the ketones is pre-filled in the sample storage unit 100 of the rotary micro device to induce the derivatization reaction.

Referring back to FIG. 3 for more detailed description, while the rotary micro device 1 is rotated first, the fluid stops momentarily by the first micro-channel 410 and the second micro-channel 420 because the fluid cannot move outward from the center of rotation by a centrifugal force due to the bent portions having a n shape in the channels. By such a stop phenomenon, the aldehyde or ketone components in the sample can perform the derivatization reaction with the DNPH-coated beads filled in the sample storage unit 100.

While the device 1 rotates first and then stops momentarily (e.g., for about 5 to 10 seconds), the derivatized aldehyde or ketone sample may move and stay from the sample storage unit 100 to the first micro-channel 410 by the capillary force, and the eluent may move and stay from the eluent storage unit 200 to the second micro-channel 420 by the capillary force.

Meanwhile, the sample storage unit 100 and the eluent storage unit 200 may include a blocking portion (not shown) for preventing the fluid sample and the eluent supplied to each of the units 100 and 200 from flowing into the micro-channels 410 and 420 directly, and the blocking portion can move a step from a front end part to a rear end part of each member using the step of the channel. In addition, a vicinity of the point where the micro-channels 410 and 420 are connected in the sample storage unit 100 and the eluent storage unit 200 may have a streamlined shape, and thus, the fluid sample and the eluent can move with minimal resistance when they move within the micro-channels.

In an embodiment of the present invention, the first rotation of the rotary micro device 1 may be performed at 2,500 to 5,000 rpm, specifically 2,500 to 3,000 rpm, for example 2,500 rpm, and the first rotation time may be 5 to 20 seconds, specifically 5 to 10 seconds, but is not limited thereto. That is, the optimal speed and time for the derivatization reaction may be experimentally determined and adjusted.

After the derivatization reaction is performed through the first rotation, the rotary micro device 1 is second rotated to introduce the derivatized fluid sample into the sample introduction portion 320 of the TLC plate 300 (S3).

As illustrated in FIG. 3, each of the first micro-channel 410 and the second micro-channel 420 may include a bent portion, wherein the number of bent portions of the second micro-channel is more than the number of the bent portions of the first micro-channel. According to this structure, when the rotary micro device 1 is rotated second, while the fluid sample containing the derivatized aldehydes or ketones moves from the first micro-channel 410 by the rotating force to flow into the TLC plate, the eluent may continuously stay in the second micro-channel 420 having more bent portions than the first micro-channel 410.

Meanwhile, the structure 20 of FIG. 3 further includes a waste channel 450 so that a sample having a content excluded by the volume of the waste channel among the sample transferred from the sample storage unit 100 through the first micro-channel 410 can be loaded into the sample introduction portion 320 of the TLC plate. For example, when the sample is injected into the sample storage unit 100 in a content of 5 µl, it can be controlled that only 0.5 µl of the derivatized sample is loaded on the TLC by designing the waste channel to have a volume of 4.5 µl. This can prevent a phenomenon that the sample is excessively loaded on the TLC to cause poor separation, which may lead to incorrect results.

Figure 5:
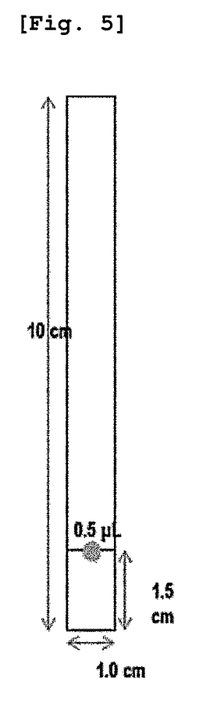
FIG. 5 shows a TLC plate included in a rotary micro device.

In an embodiment of the present invention, the TLC plate may be an RP-18 F254s TLC plate (silica gel coating, aluminum support) as illustrated in FIG. 5. The TLC plate may have a specification of 0.2 mm in C18 coating thickness and 10 cm×1 cm in plate size, and use water up to 40%.

In an embodiment of the present invention, a speed and time during the second rotation of the rotary micro device 1 are not particularly limited. For example, the second rotation may be performed at a speed of 2,000 to 4,000 rpm for 0.5 to 2 seconds.

After the sample flows into the TLC plate 300, the rotary micro device is third rotated to introduce the eluent into the absorption pad provided at the eluent introduction portion 330 located at one side end of the TLC plate 300, and to move the eluent absorbed into the absorption pad, thereby performing TLC separation of the sample (S3).

The absorption pad serves to absorb the eluent flowing into the eluent introduction unit 330 and then release the eluent at a constant speed by a rotating force during the third rotation of the rotary micro device. Thus, the sample that has previously flowed into the sample introduction portion 320 of the TLC plate 300 can be stably separated. In addition, the absorption pad suppresses a nonuniform diffusion due to wettability of the eluent generated when the eluent flows into the TLC plate 300 so that the eluent can be uniformly deployed in the TLC plate 300. If the eluent is directly introduced onto the TLC without being absorbed by the absorption pad, the TLC separation may be difficult because the eluent may move to a surrounding outer wall by its wettability near the region where the TLC is inserted.

In an embodiment of the present invention, the absorption pad may be made of a fiber having an OH functional group such as a cellulose fiber, a gelatin fiber, a starch fiber or, a mixture of two or more thereof.

Further, since the absorption pad is provided at one end of the TLC plate, a size of the absorption pad can be appropriately selected according to a size of the TLC plate, and, for example, may range from 5 to 10% of the size of the TLC plate. As an example, when the size of the TLC plate is 10 cm×1 cm (L×W), the size of the absorption pad provided at one end of the TLC plate may be 1 cm×1 cm (L×W) or 0.7 cm×1 cm (L×W).

In an embodiment of the present invention, the third rotation of the rotary micro device 1 may be performed for a relatively slowest speed and longest time compared to the other steps to control the moving speed of the eluent onto the TLC. Since the TLC is to separate the sample according to a degree of affinity between a fixed phase and a moving phase, it is advantageous to control the sample at a relatively slow speed to prevent the possibility of the sample which will be not properly separated due to a short interaction time of the sample with the fixed phase. If the third rotation is increased, the sample may not be properly separated on the TLC as the speed of the eluent moving from the absorption pad to the TLC plate increases.

Accordingly, the third rotation may be performed at a speed of 500 to 1,000 rpm, specifically 600 to 800 rpm for 1 to 5 minutes, specifically 2.5 to 5 minutes.

By controlling the third rotation speed and rotation time in the above range, that is, by controlling the strength of the rotating force, a flow rate of the eluent flowing into the TLC plate may be 0.5 to 1.5 µl/s.

Thereafter, the rotary micro device 1 is fourth rotated to dry the TLC plate 300 (S5).

The eluent used as the moving phase to separate the sample on the TLC plate may be a mixed solvent of acetonitrile and water or a mixed solvent of ethyl acetate and hexane as described above. Some of these mixed solvents volatilize when left as they are, but most of them may remain on the TLC plate.

Therefore, in case the TLC plate 300 is dried by adding the rotation step after the TLC separation, the resolution can be improved by removing the residual eluent on the TLC plate 300 by which the sample was separated once in the previous step (S3) and repeating the TLC separation once more in the subsequent step.

In an embodiment of the present invention, the fourth rotation of the rotary micro device 1 for drying the TLC plate may be performed at a speed of 2,000 to 5,000 rpm, in particular 2,000 to 3,000 rpm for 3 to 5 minutes, in particular 4 to 5 minutes, considering an efficiency of removing the residual eluent.

Meanwhile, in order to dry the TLC plate 300 more effectively, it may be advantageous that the deployment portion 310 of the TLC plate 300 in the rotary micro device 1 is disposed to face an opposite side of the center of rotation. Since the fluid introduced into the TLC plate, that is, the eluent is moved by the rotating force, it is advantageous to make the elution agent move in the same direction as the drying direction. If the movement direction of the eluent is made from the outside to the inside of the center of rotation, the direction of the eluent dried by the rotating force is opposite to each other, which may affect the of the TLC separation with the eluent.

Therefore, as illustrated in FIG. 2, the plurality of structures 20 on the rotary platform 10 of the disk shape in the rotary micro device 1 is arranged with the eluent storage unit toward the center of rotation, and is disposed with the sample storage unit and the TLC plate toward the outside thereof. The TLC plate may have a structure in which a side part of the deployment portion faces an opposite side of the center of rotation to which a centrifugal force is applied by rotation.

According to this structure, the length of the TLC plate can be designed to be short, and when the additional rotation step is applied, the drying of the residual eluent on the short TLC and subsequently the repeated TLC separation can be performed more efficiently.

After the drying process of the TLC plate is carried out, the rotary micro device is fifth rotated to introduce the eluent back into the absorption pad of the TLC plate and to move the eluent reabsorbed into the absorption pad, thereby repeatedly performing the TLC separation of the sample (S6).

The fifth rotation speed and rotation time in the step (S6) may be the same as the third rotation speed and rotation time as described above.

Further, the TLC plate on which the TLC separation is repeatedly performed is observed by using a separate detection device, such as a UV lamp, so that the sample is deployed on the TLC plate and the separated result can be visually confirmed.

According to the present invention as described above, the derivatization of the aldehydes or the ketones and the TLC separation thereof are integrally performed in a rotary micro device to simultaneously separate and detect a plurality of samples containing the aldehydes or the ketones simply and quickly, thereby allowing qualitative and quantitative analysis of aldehydes or ketones economically and efficiently as compared to the known HPLC that uses an expensive commercial DNPH cartridge and is complicatedly operated.

In particular, according to the method of the present invention, the sample and the eluent are sequentially introduced into the TLC plate by a rotating force, and then the sample can be stably separated on the TLC by moving the eluent through the absorption pad to diffuse the eluent uniformly. Also, the speed at which the solvent is moved to the TLC can be controlled by controlling the strength of the rotating force. In addition, after the sample is separated once, the solvent remaining on the TLC is dried by rotation, and a resolution of the TLC can be improved by applying the rotating force again to repeat inflow of the eluent and TLC separation.

MODE FOR CARRYING OUT THE INVENTION

Hereinafter, Example will be described in detail to help understanding of the present invention. However, the Example according to the present invention can be modified in many different forms, and the scope of the present invention should not be construed to be limited to the following Example. The Example of the present invention are provided to more fully explain the present invention to a person who has an average knowledge in the art.

Example: Detection of Aldehydes or Ketones Using a Rotary Micro Device

Firstly, the rotary micro device as illustrated in FIG. 2 was prepared. In the rotary micro device, a sample storage unit is filled with porous silica beads coated with 2,4-DNPH on the surface thereof, and the TLC plate is a RP-18 F254s TLC plate (silica gel coating, aluminum support) (C18 coating thickness of 0.2 mm, plate size of 10 cm×1 cm, L×W) having a cellulose fiber of 0.7 cm×1 cm (L×W) as an absorbent member at one side end thereof.

A fluid sample containing 1-formaldehyde, 2-acetaldehyde, 3-acetone, 4-propionaldehyde, 5-butyraldehyde, and 6-hexanal was supplied to the sample storage unit of the rotary micro device in an amount of 3 µl, and a 7:3 mixed solvent of acetonitrile (AN)/water ($H_2O$) as an eluent was supplied to the eluent storage unit in an amount of 100 µl (step S1).

Thereafter, the rotary micro device was first rotated at 2,500 rpm for 5 seconds to induce a reaction of the fluid sample and the 2,4-DNPH in the sample storage unit so that derivatization of the fluid sample was carried out (step S2).

Subsequently, the rotary micro device was second rotated at 3000 rpm for 1 second to flow the fluid sample into the sample introduction portion of the TLC plate (step S3).

Then, the rotary micro device was third rotated at 600 rpm for 5 minutes to introduce the mixed solvent of AN/$H_2O$ into the absorption pad equipped at an eluent inlet of the TLC plate. In this case, while the mixed solvent of AN/$H_2O$ absorbed instantaneously into the absorption pad was released to a deployment portion of the TLC plate at a flow rate of 0.5 µl/s, TLC separation of the sample was performed (step S4).

Thereafter, the rotary micro device was fourth rotated at 2000 rpm for 5 minutes to dry the TLC plate (step S5). Subsequently, the TLC separation was repeated by further rotating (fifth rotation) the rotary micro device at 600 rpm for 5 minutes to introduce the mixed solvent of AN/$H_2O$ into the absorption pad of the TLC plate (step S6).

Comparative Example

The same process as in Example 1 was performed except that the drying step (S5) and the repeating step (S6) of the TLC separation were omitted.

Figure 6:
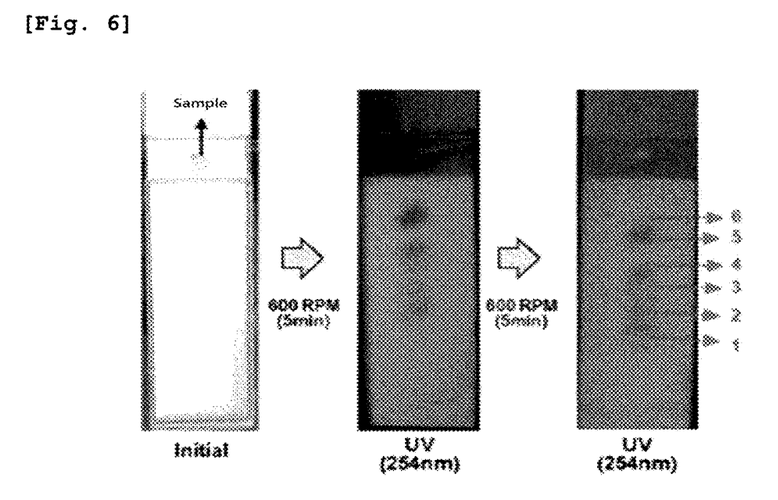
FIG. 6 shows results of separating aldehydes or ketones according to Example of the present invention.
Figure 7:
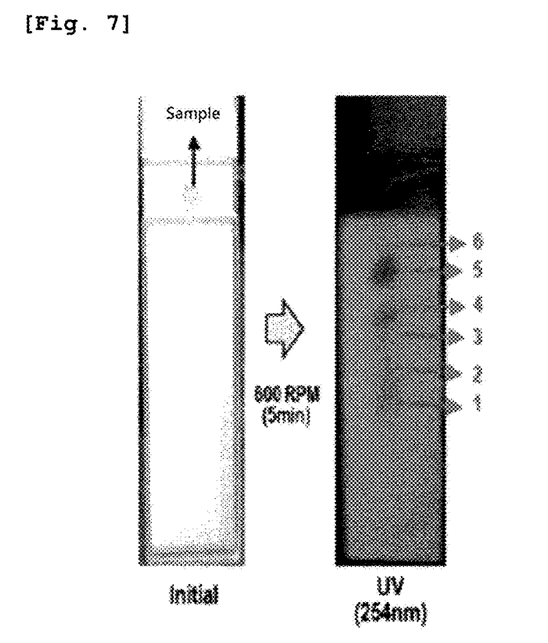
FIG. 7 shows results of separating aldehydes or ketones according to Comparative Example.

FIGS. 6 and 7 show the results of the TLC separation of the samples according to the Example and the Comparative Example, respectively. Specifically, the TLC plate on which the sample was separated in the rotary micro device was visually confirmed using a UV lamp (253 nm).

The comparison of FIG. 6 (Example) and FIG. 7 (Comparative Example) indicates that, when the drying of the TLC plate and the TLC separation was repeated by additionally performing the rotation step as in the Example, the resolution of the compounds 2, 3, 5 and 6 included in the fluid sample was improved.

What are claimed are:

1. A method for detecting aldehydes or ketones comprising the steps of:
(S1) providing a rotary micro device comprising one or more structures disposed on a rotary platform, wherein each of the structures includes a sample storage unit filled with a derivatizing compound for aldehydes or ketones, an eluent storage unit, a thin layer chromatography (TLC) plate equipped with an absorption pad, a first micro-channel connecting the sample storage unit and the TLC plate and having one or more bent portions, and a second micro-channel connecting the eluent storage unit and the TLC plate and having a plurality of bent portions, the number of the plurality of bent portions of the second micro-channel being more than the number of the one or more bent portions of the first micro-channel, and supplying a fluid sample containing aldehydes or ketones and an eluent for deploying the sample to the sample storage unit and the eluent storage unit, respectively;
(S2) performing derivatization of the aldehydes or the ketones by carrying out a first rotation of the rotary micro device to react the fluid sample with the derivatizing compound filled in the sample storage unit;
(S3) introducing the fluid sample containing the derivatized aldehydes or ketones into the TLC plate by carrying out a second rotation of the rotary micro device;
(S4) performing TLC separation of the sample by carrying out a third rotation of the rotary micro device to introduce the eluent into the absorption pad of the TLC plate and moving the eluent absorbed into the absorption pad;
(S5) drying the TLC plate by carrying out a fourth rotation of the rotary micro device; and
(S6) repeatedly performing the TLC separation of the sample by carrying out a fifth rotation of the rotary micro device to introduce the eluent back into the absorption pad of the TLC plate and moving the eluent reabsorbed into the absorption pad, wherein the derivatizing compound is 2,4-dinitrophenylhydrazine (2,4-DNPH), wherein the rotary platform is fabricated by assembling an upper layer portion, a middle layer portion and a lower layer portion, wherein the TLC plate equipped with the absorption pad is arranged on the lower layer portion,
wherein the first micro-channel and the second micro-channel are arranged on the middle layer portion and the upper layer portion,
wherein the first micro-channel and the second micro-channel arranged on the middle layer portion are a first part of the first micro-channel and a first part of the second micro-channel respectively, and the first micro-channel and the second micro-channel arranged on the upper layer portion are a second part of the first micro-channel and a second part of the second micro-channel respectively,
wherein the first part of the first micro-channel includes a bent portion connected to the sample storage unit and the first part of the second micro-channel includes a bent portion connected to the eluent storage unit are arranged on the middle layer portion, and wherein the second part of the first micro-channel includes a portion connected to the TLC plate and the second part of the second micro-channel includes a portion connected to the TLC plate are arranged on the upper layer portion.

2. The method according to claim 1,
wherein the TLC plate sequentially includes an eluent introduction portion, a sample introduction portion, and a deployment portion on one side thereof,
wherein the eluent introduction portion is provided with the absorption pad,
wherein the eluent introduction portion of the TLC plate is connected to the eluent storage unit by the second micro-channel, and
wherein the sample introduction portion of the TLC plate is connected to the sample storage unit by the first micro-channel.

3. The method according to claim 2, wherein the first micro-channel in the rotary micro device includes a waste channel for preventing excessive introduction of the sample between the one or more bent portions and the sample introduction portion of the TLC plate.

4. The method according to claim 2, wherein the deployment portion of the TLC plate is arranged to extend in a direction away from the center of rotation in the rotary micro device.

5. The method according to claim 2, wherein the absorption pad provided in the eluent introduction portion of the TLC plate occupies 5 to 10% of the total length of the TLC plate.

6. The method according to claim 1, wherein the first micro-channel and the second micro-channel in the rotary micro device are connected by an air circulation channel.

7. The method according to claim 1, wherein the fluid sample containing the derivatized aldehydes or ketones moves into the first micro-channel from the sample storage unit by a capillary force and stays therein, and the eluent moves into the second micro-channel from the eluent storage unit by the capillary force and stays therein, while the rotary micro device is stopped after the first rotation of the step (S2).

8. The method according to claim 1, wherein during the second rotation of the step (S3), while the fluid sample containing the derivatized aldehydes or ketones moves from the first micro-channel by rotating force and flows into the TLC plate, the eluent stays in the second micro-channel.

9. The method according to claim 1, wherein the first rotation of the step (S2) is performed at a speed of 2,500 to 5,000 rpm for 5 to 20 seconds, and
the second rotation of the step (S3) is performed at a speed of 2,000 to 4,000 rpm for 0.5 to 2 seconds.

10. The method according to claim 1, wherein the third rotation of the step (S4) and the fifth rotation of the step (S6) are performed at the slowest speed and for the longest time compared to the other steps, to perform the inflow of the eluent and the TLC separation.

11. The method according to claim 10, wherein the third rotation of the step (S4) and the fifth rotation of the step (S6) are performed at a speed of 500 to 1,000 rpm for 1 to 5 minutes.

12. The method according to claim 10, wherein a flow rate of the eluent is 0.5 to 1.5 µl/s.

13. The method according to claim 1, wherein the fourth rotation for drying the TLC plate in the step (S5) is performed at a speed of 2,000 to 5,000 rpm for 3 to 5 minutes.

14. The method according to claim 1, wherein the 2,4-DNPH is coated on a surface of a silica in the form of a porous bead and filled into the sample storage unit.

15. The method according to claim 1, wherein the absorption pad is made of a fiber having an OH functional group.

16. The method according to claim 15, wherein the absorption pad is made of a cellulose fiber, a gelatin fiber, a starch fiber, or a mixture of two or more thereof.

17. The method according to claim 1, wherein the fluid sample containing aldehydes or ketones includes formaldehyde, acetaldehyde, acrolein, acetone, propionaldehyde, butyraldehyde, benzaldehyde, crotonaldehyde, iso-valeraldehyde, n-valeraldehyde, o-tolualdehyde, m-tolualdehyde, p-tolualdehyde, hexaldehyde, 2,5-dimethylbenzaldehyde, hexanal, or a mixture of two or more thereof.

18. The method according to claim 1, wherein the eluent is a mixed solvent of acetonitrile and water, or a mixed solvent of ethyl acetate and hexane.

* * * * *